June 9, 1964
G. P. ARNOLD ETAL
3,136,697
HYDRAULIC SAMPLE CHANGER FOR TANK-TYPE
WATER-COOLED NUCLEAR REACTORS
Filed Aug. 1, 1961
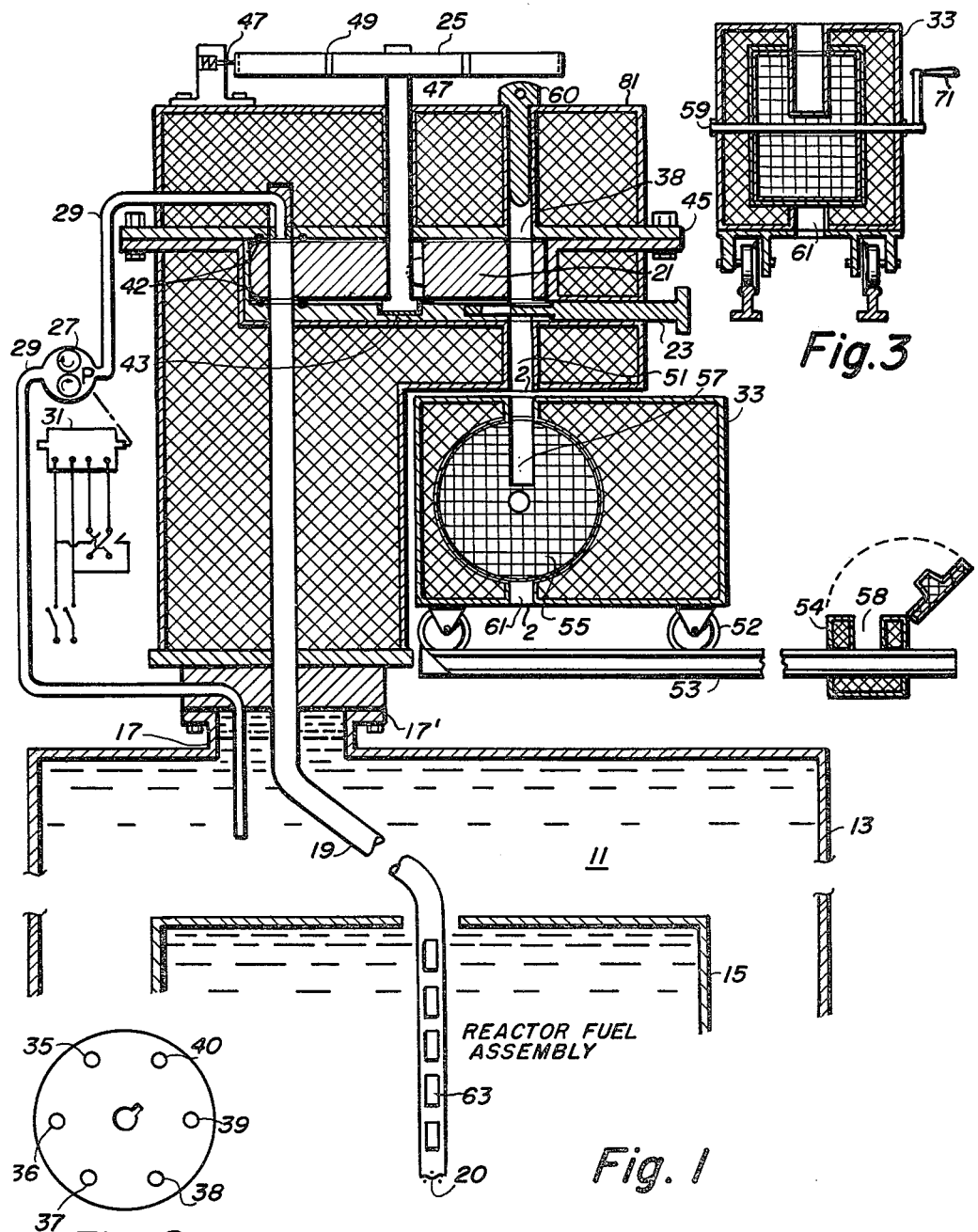
INVENTORS
George P. Arnold
Paul D. O'Brien
Frank D. Newcom
William D. Schafer

United States Patent Office 3,136,697
Patented June 9, 1964

3,136,697
HYDRAULIC SAMPLE CHANGER FOR TANK-TYPE WATER-COOLED NUCLEAR REACTORS
George P. Arnold and Frank D. Newcom, Los Alamos, Paul D. O'Brien, Albuquerque, and William D. Schafer, Los Alamos, N. Mex., assignors to the United States of America as represented by the United States Atomic Energy Commission
Filed Aug. 1, 1961, Ser. No. 128,602
2 Claims. (Cl. 176—15)

This application relates to a device for inserting containers of material into the core of the tank-type water-cooled nuclear reactor to be irradiated and for later removing them quickly and safely without interrupting operation of the reactor.

The irradiation of materials by core activity of nuclear reactors has become an important function of such reactors. A problem long existent concerns the danger to operating personnel required to withdraw materials having induced radioactivity from the reactor. In addition, a number of difficulties exist which prevent continuous operation of such reactors when materials are to be irradiated in the core.

The problems existent in prior art tank-type reactors and which are solved by the present invention will be appreciated from a brief description of an existent water-cooled reactor of the tank type. This reactor has its fuel elements immersed in pure water in a tank which is of the order of 8 feet in diameter and having a depth of the order of 25 feet. The core fuel elements are situated in the water at a considerable depth from the top of the tank. The tank is completely filled with water having a pressure of the order of 4 pounds or more per square inch against the top closure of the tank. The water is circulated very rapidly through the tank and the core, then through an external heat exchanger to dissipate heat generated by operation of the reactor.

Irradiation of a material is accomplished by sealing it in a container of special design and placing the sample package within the core for the required irradiation. It is then removed and deposited in a shielded container. If done manually, this procedure entails opening the access hatch on top of the reactor, once to insert the sample and again to remove it. This requires the reactor to be shut down on both occasions so water pressure can be reduced to atmospheric and water circulation can be stopped, thus twice interrupting other experimental programs in progress. Manual removal of samples is dangerous and time consuming. After the above steps have been taken, the samples are removed by means of a staff having a length of the order of 20 feet and having a gripping device on one end. The irradiated sample, when removed from the tank, is usually too highly radioactive to be approached by the handling personnel. Consequently, succeeding operations must be by means of the long staff. Invariably, the place of utilization of the radioactive sample is far removed from the locale of the reactor, and in order for the samples to be safely handled while en route to their destination they must be confined in an effective shield. This shield is a container with a suitable thick lead lining, the thickness depending on the amount and nature of activity of the sample. The final step in the removal process is to insert the sample by means of the long staff into the shielded container and to place a cover or plug over or into the opening of the shielded container. The tank access hatch is then closed, the water circulation again started and the reactor brought up to power.

The foregoing difficulties, hazards and time-consuming activities are eliminated by the device of the present invention. In brief, this invention permits samples to be inserted into the core and removed at will without, in any manner, interrupting the operation of the reactor and with negligible exposure of personnel to radioactivity. In addition, it provides for the sequential withdrawal and temporary safe storage of samples which are in the way of a wanted sample, the selection and insertion of the wanted sample directly into a shielded container and the reinsertion of the other samples into the reactor core.

The description of the present invention proceeds with reference to the drawings made a part of this specification in which:

FIGURE 1 is a vertical cross-sectional view of the sample handling device of the present invention;

FIGURE 2 is a horizontal top view of element 21 shown in FIGURE 1; and

FIGURE 3 is a vertical cross section on plane 2—2 of shielded sample container 33.

Referring to the drawing, the numeral 11 refers generally to a water-cooled reactor comprising a coolant tank 13 and a reactor fuel assembly or core, 15. The upper wall or ceiling of the coolant tank is provided with a hatch 17 having a flange 17'. The device of the present invention is constructed to be seated upon and bolted to flange 17'.

The preferred embodiment illustrated comprises a sample conveyor tube 19, a rotatable magazine 21, a slide gate 23, an indexed handle 25, a reversible pump 27 and associated tubing 29.

To the end that samples may be inserted into or withdrawn from the reactor fuel core the tube 19 is provided. The core end of this tube which is the conveyor tube storage portion is provided with screen 20 so that the tube is open to free passage of water but not of samples. Utilization is made of the fact that samples will move upward out of tube 19 if there is an excess of water pressure at the bottom of the tube over that existent at the upper end. Conversely, samples may be inserted into the reactor core if, after the samples are inserted in the tube 19, water pressure at the upper end of the tube is in excess of that existent at the bottom of the tube. Direction of the pressure for either operation is obtained by the provision of reversible motor 31 driving reversible pump 27, which is attached to tubing 29. One leg of tubing 29 is in communication through a magazine chamber with the upper end of tube 19 and the other leg of tubing 29 enters the reactor tank 13.

When a particular sample is to be extracted from the core and deposited into a shielded container, a mechanism must be provided to store samples which are ahead of the selected sample and to discharge the wanted sample into an exit duct, which is in communication with the shielded container. These functions are supplied by rotatable magazine 21. This magazine is generally cylindrical in shape and is provided with a plurality of through chambers 35–40 (see FIGURE 2) disposed in a circle proximate to the periphery of the cylinder and parallel to the axis of the cylinder. The magazine can be provided with any desired number of chambers, but for purposes of description the number is chosen as 6. The magazine is supported on shaft 47 which rotates in bearing 43. Resilient gaskets 42 prevent escape of core water when through chambers align with tube 19. The upper end of tube 19 is supported in alignment with the radius of rotation of the magazine chambers. The upper surface of magazine 21 has a close fit with the upper bearing plate 45. It is apparent that the upper end of tube 29 is in communicative relationship with tube 19 when a magazine chamber is in alignment with tube 19. The upper end of shaft 47 is provided with the indexed hand spoked wheel 25. Alignment of magazine chambers with tube 19 is indicated by engagement of plunger 47 with detents 49 on handwheel 25. A sample discharge port 51 is provided to permit the removal of a sample from a magazine chamber. The upper end of this port is provided with slide gate 23 so that the bottom of the magazine chambers, when they pass over discharge port 51, are maintained closed when the gate is in closed condition. It follows that individual samples in the magazine chambers are confined to such chambers until a selected sample is over slide gate 23 and slide gate 23 is deliberately manipulated to open the discharge port. Shielded container 33 is on wheels 52, which in turn are supported on track 53. Shielded container 33 is provided with rotatable magazine 55 having a radially aligned chamber 57. The magazine is supported on a horizontal shaft 59 (see FIGURE 3) one end of which is provided with a handle 71.

When magazine 21 is in a selected position whereby a chamber containing a selected sample is over discharge port 51, the slide gate 23 is opened and the sample drops into chamber 57 of shielded container magazine 55. Magazine 55 is then rotated a sufficient angle, preferably one quadrant, so that the open end of chamber 57 is effectually closed by the shielding wall of container 33. The transfer of a sample from shielded container 33 to a suitable shipping or storing vessel 54 is accomplished by moving container 33 to a position on track 53 so that discharge port 61 is aligned with the pocket 58 of shipping vessel 54 and then rotating magazine 55 until chamber 57 is aligned with lower exit port 61.

A sample is inserted in the core as follows: Gate 23 is closed, plug 60 from the upper shield body 81 is removed and the sample is dropped into magazine chamber 38. Magazine 21 is rotated to the position where chamber 38 is aligned with tube 19, and pump 27 is activated to provide a pressure head above the sample. The sample is thus inserted into the core portion 63 of tube 19. If other samples were to be replaced in tube core portion 63, the respective magazine chambers would be aligned with tube 19 in the selected sequence and the samples inserted in the core in the desired sequence.

The foregoing description pertains to a specific embodiment but it is understood that various changes may be made without departing from the spirit of the invention. Accordingly, the invention is limited only by the appended claims taken in view of the prior art.

What is claimed is:

1. A hydraulic sample changer for fluid-cooled nuclear reactors having a coolant pressure vessel, a reactor core and a reactor core sample irradiating space in the reactor core comprising a conveyor tube having a storage portion and a conveying portion, said conveyor tube storage portion being supported in the reactor core sample irradiating space and said conveyor tube conveying portion having an outer end passing out of the coolant pressure vessel; a sample transient storage magazine, said magazine being right-cylindrical in shape and being supported for rotation on an axle passing through its central axis, a plurality of separate chambers passing through said magazine parallel to the axis thereof and situated on a circle having a center on the axis of the same; a first bearing plate supported between said magazine and the reactor, said bearing plate having at least first and second passages spaced from each other through the thickness thereof, and positioned in line with the circle of location of the magazine chambers, a second bearing plate supported adjacent the opposite side of the magazine and having first and second passages therethrough, respectively, in line with the passages in the first bearing plate, said second bearing plate having a diameter at least equal to the diameter of the magazine and having a journal bearing in the center thereof to support the magazine axle, said magazine axle passing through the second bearing plate journal bearing, an indexed hand wheel secured to the outer end of the magazine axle, said conveyor tube outer end being connected to the first bearing plate first passage, reversible hydraulic pressure means connected between and to the second bearing plate first passage and to the reactor coolant pressure vessel; the conveyor tube storage portion having a fluid transmissible screen element secured in the free end thereof, access port means supported adjacent to and aligned with the second bearing plate second passage and discharge port means supported adjacent to and aligned with the first bearing plate second passage, a slide valve supported transverse of said first plate second passage and adapted to be manipulated to open and close the said second passage, whereby a sample of material to be irradiated can be inserted into a chamber of said magazine through said access port and upon manipualting said magazine to align said chamber with the conveyor tube, excess hydraulic pressure above said sample urges said sample into said conveyor tube storage portion, and whereby any sample in the conveyor storage portion can be retrieved by a deficiency of hydraulic pressure at the magazine relative to the pressure in the coolant pressure vessel by selectively manipulating the magazine to transiently store in the magazine samples ahead of and including the wanted sample, and finally by manipulating the chamber of the magazine containing the wanted sample into alignment with the first bearing plate second passage and opening said slide valve, the said wanted sample is discharged from said magazine.

2. The sample changer of claim 1 in which a biological shield envelopes the conveyor tube, magazine and associated apparatus, said shield being relieved under the magazine for approximately half the diameter thereof on the far side thereof from the conveyor tube, whereby said discharge port overhangs a movable shielded chamber provided for the transport of an activated element away from said reactor.

References Cited in the file of this patent

UNITED STATES PATENTS

| | | |
|---|---|---|
| 2,204,340 | Bradshaw | June 11, 1940 |
| 2,868,706 | Untermyer et al. | Jan. 13, 1959 |
| 2,990,356 | Chapellier et al. | June 27, 1961 |
| 3,089,836 | Wootton | May 14, 1963 |

FOREIGN PATENTS

| | | |
|---|---|---|
| 564,440 | Belgium | Feb. 15, 1958 |
| 231,752 | Australia | Jan. 5, 1961 |